UNITED STATES PATENT OFFICE.

MITCHEL WOLF AND HARRY COWEN, OF NEW YORK, N. Y.

FOOD PRODUCT.

1,074,483.  Specification of Letters Patent.  Patented Sept. 30, 1913.

No Drawing.  Application filed May 16, 1913.  Serial No. 768,063.

*To all whom it may concern:*

Be it known that we, MITCHEL WOLF and HARRY COWEN, citizens of the United States and Russia, respectively, residing at New York, in the county of New York and State of New York, have invented certain new and useful Improvements in Food Products; and we do hereby declare the following to be a full, clear, and exact description of the invention, such as will enable others skilled in the art to which it appertains to make and use the same.

Our invention has for its object the production of a new and improved food product which shall be nutritious, pleasant to the taste and can be economically produced. For this purpose, we use the following raw materials:—glucose, sugar, soap root, water, peanut butter, cotton-seed oil and sesame seed, which materials are employed in the manner and proportions hereinafter stated.

We take of ordinary glucose thirty-four (34) parts and boil same for from one to two hours with fifteen (15) parts of granulated sugar; while still hot, we add to this mixture about one (1) part of a saturated hot water extract of soap root. For the proportion of the peanut butter used, we take cleaned, hulled peanuts which have been roasted and these are ground to peanut butter, the grinding being continued, however, only till a coarse peanut butter is obtained. The cotton-seed oil used should be clarified and edible cotton-seed oil which requires no preparation is used in this product. The sesame seed used is first hulled to remove the dark outer skins from the seeds and pure white soft sesame seeds are thus obtained. These seeds are then roasted to change the sesame oil into edible form and after roasting the seeds are ground by which means, a thick oily liquid is obtained. To the foregoing hot mixture of glucose, sugar and soap root extract are now added twenty-five (25) parts of peanut butter, ten (10) parts of cotton-seed oil and fifteen (15) parts of ground sesame seed prepared as hereinbefore described. The product thus obtained is thoroughly stirred and while hot is decanted into the containers in which it is thereafter sold.

We are aware that the use of glucose, granulated sugar and a fatty substance to produce a food product is old but it is new to produce an improved food product of superior flavor according to the above formula.

What we claim is:—

1. A composition of matter comprising glucose, dextrose, soap root extract, peanut butter, cotton-seed oil and ground sesame seed.

2. A composition of matter comprising glucose, granulated sugar, cotton-seed oil, peanut butter and ground sesame seeds.

3. A composition of matter comprising glucose, granulated sugar, peanut butter and cotton-seed oil.

4. A composition of matter comprising glucose, granulated sugar, cotton-seed oil and a mixture of semi-solid fatty substances.

5. A composition of matter comprising glucose, granulated sugar, soap root extract, cotton-seed oil and a mixture of semi-solid fatty substances.

6. A composition of matter comprising approximately the following composition:— glucose, thirty-four (34) parts, granulated sugar fifteen (15) parts, saturated soap root extract one (1) part, peanut butter, twenty-five (25) parts, cotton-seed oil, ten (10) parts, ground sesame seeds, fifteen (15) parts.

7. The process of producing a food product consisting in boiling glucose and granulated sugar, adding thereto hot saturated extract of soap root and mixing therewith a mixture of peanut butter, cotton-seed oil and roasted and ground sesame seeds.

8. A process for the production of a food product consisting of boiling approximately thirty-four parts of glucose and fifteen parts of granulated sugar, adding thereto one part of a hot saturated water extract of soap root and adding to the foregoing mixture, a mixture of twenty-five parts peanut butter, ten parts cotton-seed oil and fifteen parts of ground hulled and roasted sesame seeds.

In testimony whereof we affix our signatures in presence of two witnesses.

MITCHEL WOLF.
HARRY COWEN.

Witnesses:
MAE PERRY,
HUGO MOCK.